United States Patent [19]
Orndorff, Jr.

[11] Patent Number: 5,518,318
[45] Date of Patent: May 21, 1996

[54] BEARING ASSEMBLY

[75] Inventor: Roy L. Orndorff, Jr., Kent, Ohio

[73] Assignee: The BF Goodrich Company, Akron, Ohio

[21] Appl. No.: 273,388

[22] Filed: Jul. 11, 1994

Related U.S. Application Data

[63] Continuation-in-part of Ser. No. 169,931, Dec. 20, 1993, Pat. No. 5,372,430, which is a continuation-in-part of Ser. No. 930,639, Aug. 17, 1992, abandoned, which is a continuation of Ser. No. 382,463, Jul. 20, 1989, abandoned, which is a continuation of Ser. No. 181,897, Apr. 15, 1988, abandoned.

[51] Int. Cl.⁶ .................................................. F16C 27/06
[52] U.S. Cl. ............................................................. 384/98
[58] Field of Search ................................ 384/97, 98, 282, 384/283, 284, 295

[56] References Cited

U.S. PATENT DOCUMENTS

| | | | |
|---|---|---|---|
| 2,393,017 | 1/1946 | Boyd et al. .................... | 384/98 |
| 3,971,606 | 7/1976 | Nakano et al. ................. | 384/97 |
| 3,993,371 | 11/1976 | Orndorff, Jr. ................. | 384/97 |
| 4,725,151 | 2/1988 | Orndorff, Jr. ................. | 384/98 |

FOREIGN PATENT DOCUMENTS 18118 2/1981 Japan ..................................... 384/97

*Primary Examiner*—Thomas R. Hannon
*Attorney, Agent, or Firm*—Richard A. Romanchik

[57] ABSTRACT

A bearing assembly for supporting a drive shaft of a ship wherein the shaft is generally to be supported by such bearing assembly in a horizontally extending position. The bearing assembly has a housing with a cylindrical shell mounted therein having a central bore with a longitudinally extending central axis. The shell has a set of circumferentially spaced staves to support the drive shaft. All of the staves are comprised of a slippery polymer alloy and project into the central bore of the shell. The staves are held in place by gripping members comprised of an elastomeric member compressed by a rigid plate.

18 Claims, 6 Drawing Sheets

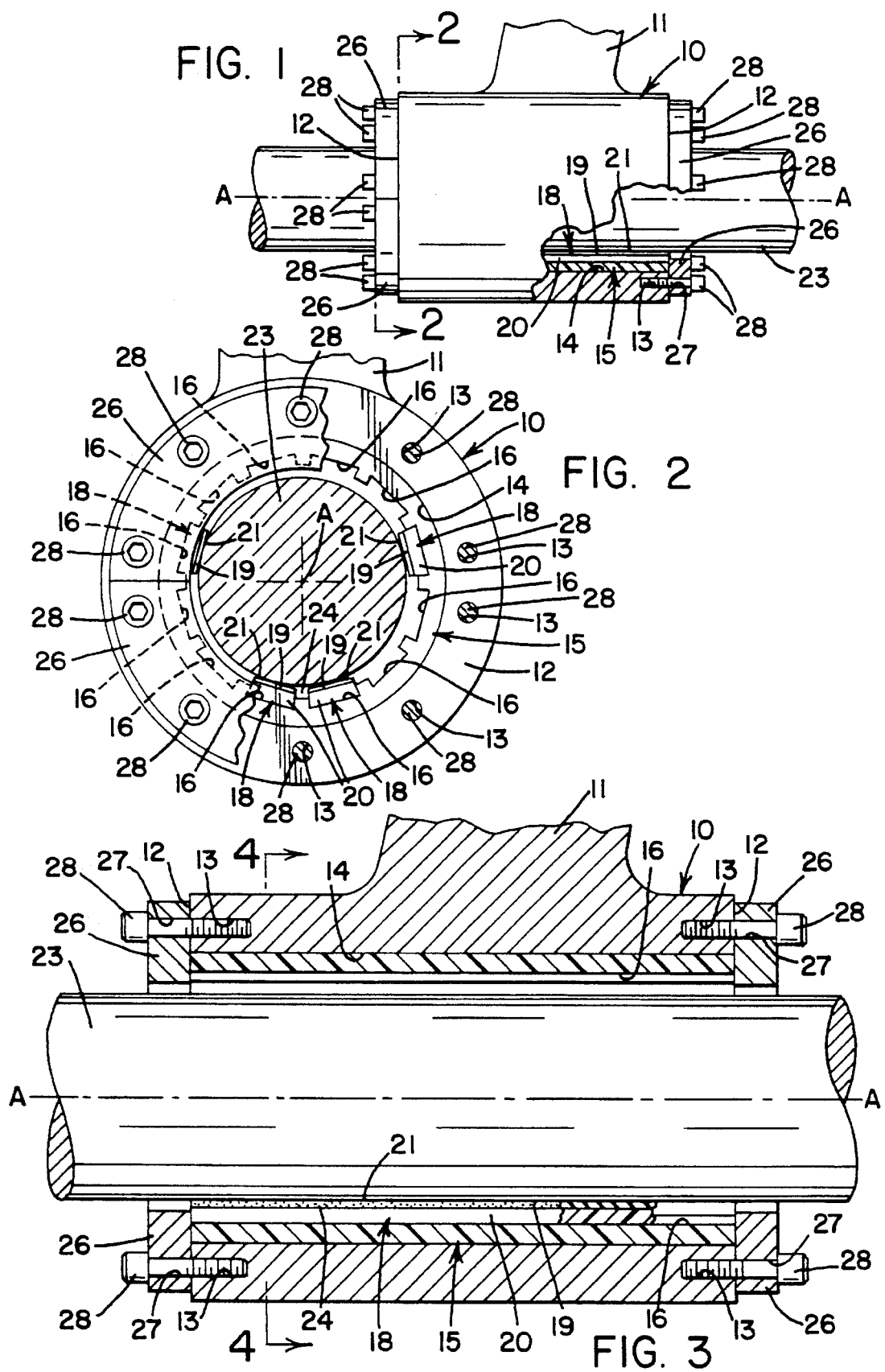

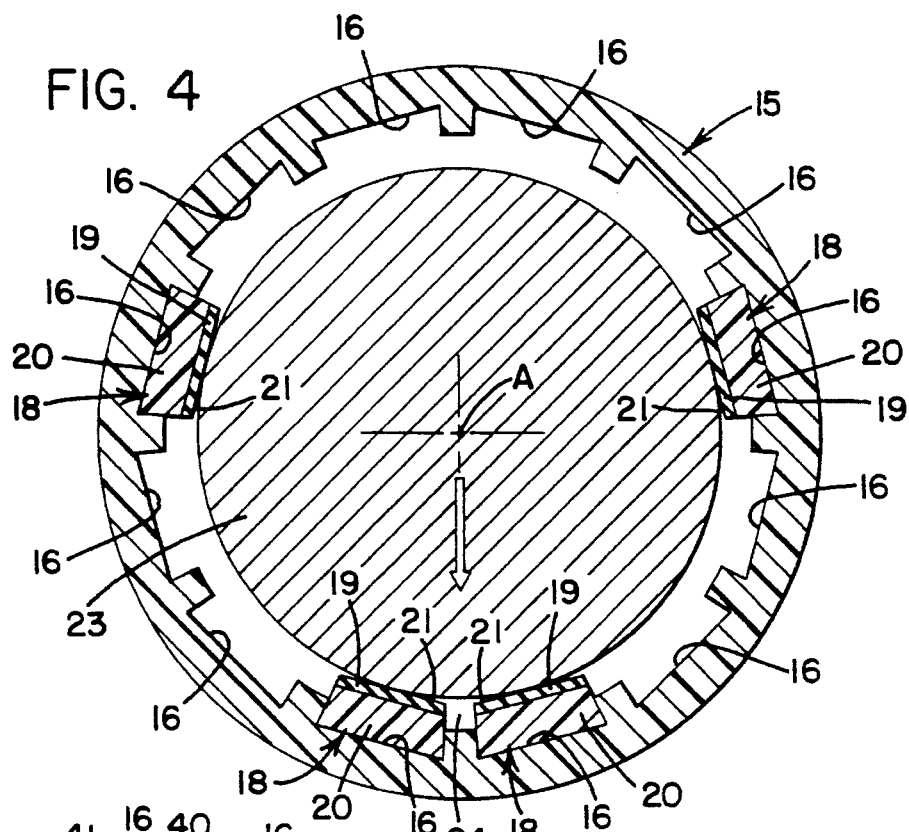
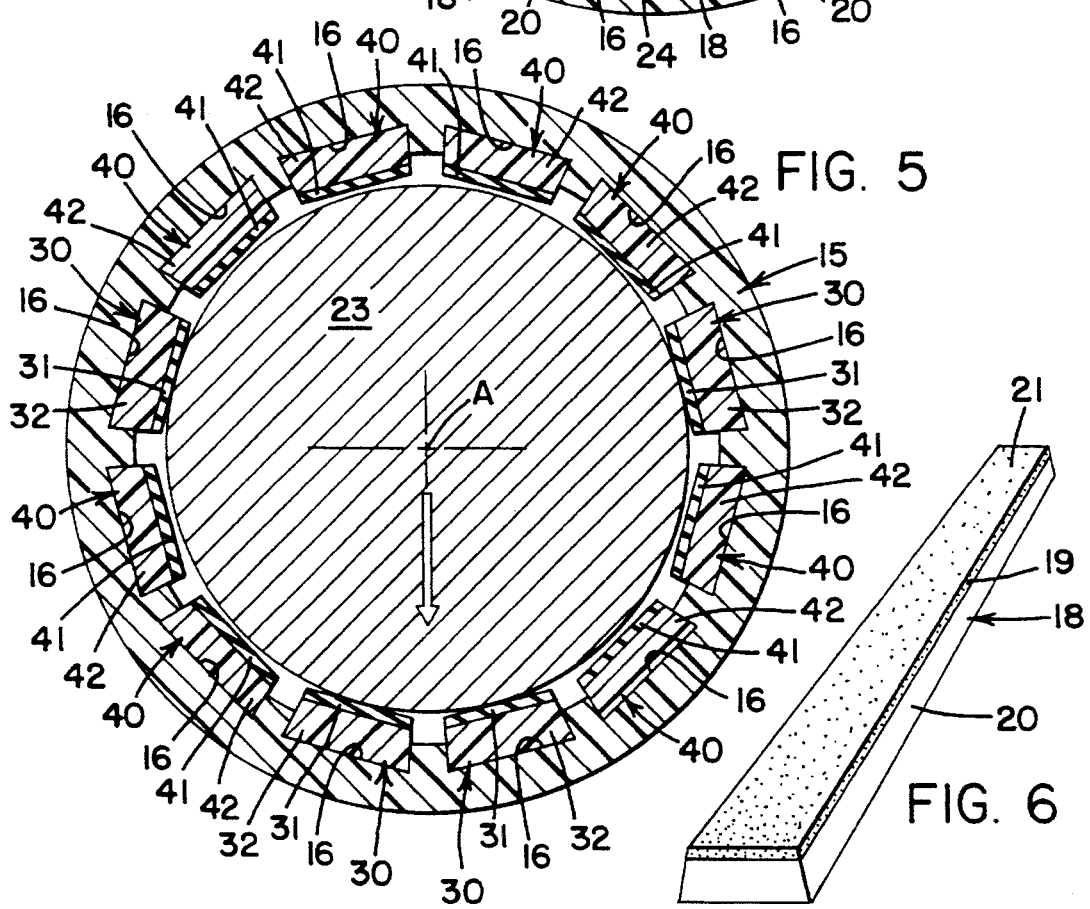

FOUR STAVES, GLASS SMOOTH SURFACE FINISH
COEFFICIENT OF FRICTION vs. SHAFT SPEED

BEARING ASSEMBLY

This is a continuation-in-part application of application Ser. No. 08/169,931 filed Dec. 20, 1993, now U.S. Pat. No. 5,372,436 which was a continuation-in-part application of application Ser. No. 07/930,639, filed Aug. 17, 1992, abandoned, which was a continuation application of application Ser. No. 07/382,463, filed Jul. 20, 1989, abandoned, which was a continuation of originally filed application Ser. No. 07/181,897, filed Apr. 16, 1988, abandoned.

BACKGROUND OF THE INVENTION

This invention relates to a bearing assembly and more particularly to a new and novel bearing assembly for use in supporting a water lubricated propeller shaft as in large naval ships. Bearing assemblies with elastomeric bearing elements are particularly suited for this purpose because of their excellent ability to withstand the effects of corrosive fluids and to abrasion resulting from particles of foreign matter carried in suspension in the sea water in which the shaft and bearing assembly operates. Such bearing assemblies with their elastomeric bearing elements have been made and are still being made with outer non-corrosive support or shell with a plurality of circumferentially evenly spaced elastomeric staves therein.

The present invention is directed to a novel bearing assembly utilizing an outer shell and an inner shell with a plurality of circumferentially spaced elastomeric bearing elements that have only selected staves in contact with the shaft leaving other staves with clearance space to eliminate any contact with the shaft to thereby reduce the bearing friction torque thus enhancing the performance of the bearing. Test results have shown that for the same rubber thickness there is a substantial reduction in friction when the conventional number of staves (12) is reduced in number (to 4).

SUMMARY OF THE INVENTION

A bearing assembly with a housing that has a central bore. A cylindrical shell is securely mounted within the central bore and presents a central opening whose central axis is coincident with the central bore. The shell has a plurality of recesses around its inner periphery to selectively receive bearing staves that project elastomeric bearing elements into the central opening. Certain ones of the staves have their radial innermost bearing surface closer to the central axis than the bearing surfaces of other bearing staves. An alternative is to only mount a few circumferentially spaced staves whose bearing surfaces all are equidistant from the central axis but the circular distance between such staves is such that certain adjacent staves are close to each other while other staves have substantial distance between them.

BRIEF DESCRIPTION OF THE DRAWINGS

FIG. 1 is a side elevational view of a strut and bearing assembly for supporting a rotatable shaft;

FIG. 2 is an elongated front elevational view of the strut and bearing assembly taken on line 2—2 of FIG. 1 with a portion of the cap broken away to show the bearing staves;

FIG. 3 is a side elevational view in cross section of the strut and bearing assembly;

FIG. 4 is a further enlarged cross-sectional view of the bearing assembly taken on line 4—4 of FIG. 3;

FIG. 5 is a cross-sectional view of a modification of the bearing assembly shown in FIG. 4;

FIG. 6 is a perspective view of a bearing stave used in the bearing assembly of FIG. 4;

DETAILED DESCRIPTION

Figure 7:
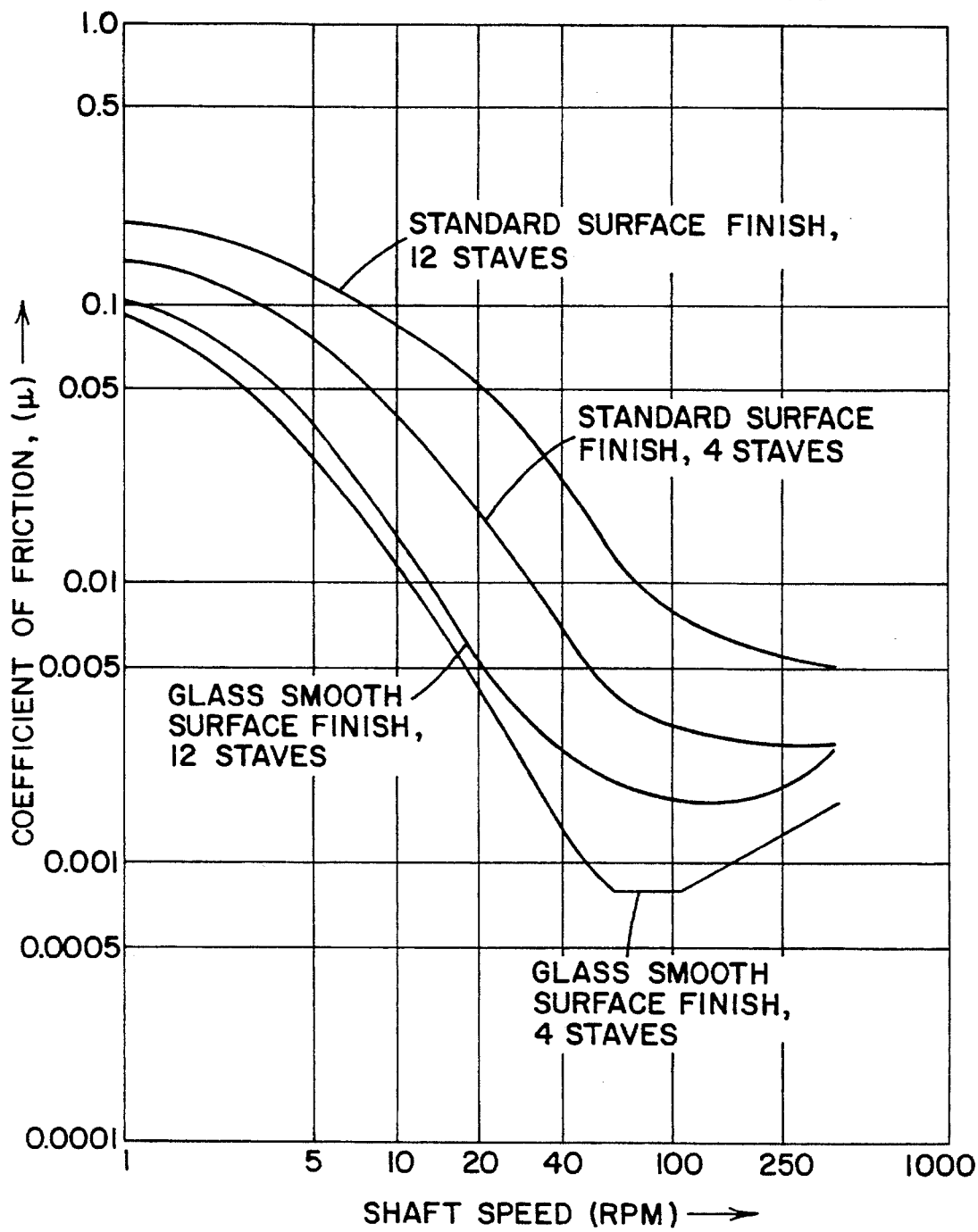
FIG. 7 is a graph illustrating the difference in coefficient of friction versus shaft speed between a bearing assembly having 12 staves in comparison to 4 staves.

Referring to the drawings, wherein like reference numerals designate like or corresponding parts throughout the several views, there is shown in FIG. 1 a longitudinally extending bearing housing 10 supported by a strut 11 that extends downwardly from the bottom of a ship. Housing 10 has a pair of annular end faces 12, with each end face having a plurality of circumferentially spaced threaded bores 13. Housing 10 has a central bore 14 to receive a bearing assembly to be described. The bearing assembly has an outer cylindrical shell 15 which has a plurality of circumferentially spaced recesses 16 around the radial inner portion thereof. The recesses 16 are dovetailed slots or grooves which are trapezoidal as viewed in a front elevational view as per FIGS. 4 and 5. Such rigid outer shell may be a metallic structure such as brass, a plastic shell or a composite non-metallic structure with a plurality of annularly disposed radially adjacent layers as in U.S. Pat. No. 3,932,004 embedded with a vulcanized synthetic rubber compound or a cured polyethylene compound. Located in selective recesses 16 of shell 15 are a plurality of bearing staves 18.

Each stave 18 has a resilient elastomeric portion or bearing element 19 secured to a rigid backing member or strip 20.

The rigid backing member or strip 20 is made of an ultra high molecular weight polyethylene having a melt flow index less than 0.15. Such bearing element 19 and strip 20 may be made separably and then cut to their desired shape and then bonded together or such bearing elements 19 and backing strips 20 may be made into separate sheets, then bonded together and then cut into trapezoidal shapes such that the elastomeric inner bearing element 19 has a smaller base than the rigid backing strip 20. The radial innermost portion of the elastomeric bearing element 19 of each stave 18 when installed in the dovetailed groove or recess 16 has a linear flat bearing surfaces 21.

As seen in FIG. 4, twelve grooves or recesses 16 are shown with only four staves 18 installed therein. Two staves 18 are mounted in the two most lowest recesses 16 in the bottom of shell 15 and two staves 18 are installed in two laterally spaced recesses (as seen in FIG. 4) located in the upper portion of the shell 15. Since the two lower staves 18 have their flat surfaces disposed at angles to each other, they support the drive shaft 23 journaled in such bearing assembly. The two upper staves 18 tangentially engage the drive shaft 23 and support it for rotation in cooperative action with the lower staves 18. Drive shaft 23 is centrally located within the central opening of the shell 15 as depicted by a central axis A—A in FIG. 3, which is also the central axis of the central bore of bearing housing 10.

The respective adjacent staves 18 located in the lower portion of the shell 15 (FIG. 4) have a clearance space 24 between them to facilitate the flow of lubricant. Such outer shell 15 and the staves 18 abutting the drive shaft 23 are retained with the central bore of the bearing housing 10 by pairs of semi-circular rings 26 on each side of the bearing housing. Rings 26 have a plurality of circumferentially spaced bores 27 which receive cap screws 28 threaded into the respective threaded bores 13 to firmly secure the staves 18 and shell 15 into housing 10.

A modification of the above described invention is shown in FIG. 5 which discloses the same outer shell 15 with its plural circumferentially spaced recesses or dovetailed slots 16. Every slot or recess 16 will receive either a bearing stave 30 or a bearing stave 40. Bearing staves 30 are substantially identical to the bearing staves 18 of the first embodiment and have a resilient elastomeric portion or bearing element 31 secured to a rigid backing member or strip 32. The bearing staves 40 are also substantially identical to the bearing staves 18 but have their overall thickness less than that of stave 30. Stave 40 has a resilient elastomeric portion or bearing element 41 secured to a rigid backing member or strip 42 but the overall thickness of strip 42 is less than strip 32 with the thickness of the resilient pad 31 being equal to the thickness of resilient pad 41. This construction thus allows the respective staves 30 to contact the drive shaft while the respective staves 40 have sufficient clearance space to prevent their contact with the drive shaft 23 under normal conditions of operation. With this arrangement of the bearing staves, the load per stave that makes contact is increased and thereby reduces the low shaft speed coefficient of friction since the side staves in the loaded bottom half of the bearing are eliminated. It has been determined the load on a stave is a function of the angle that the rubber surface, such as bearing surface 21, makes to the direction of the total load by the loaded bearing half and with the arranged bearings as described above there is a greater efficiency in the load bearing surface resulting in lower friction torque because the coefficient of friction is lower the higher the normal (perpendicular) load per stave. The total load carried by the bearing is the same regardless of the number of staves in contact with the journal.

Referring to the graph in FIG. 7 there is plotted the coefficient of friction versus shaft speed when comparing bearing assemblies of the type described above having stave rubber thicknesses of 0.313 inches where the only variable is the number of staves. It is to be noted that the plots are log-log, which means that the differential in distance on the graph does not have to be great to be a very substantial reduction in friction as indicated. The uppermost or top curve is that of a standard surface finish 12 stave bearing assembly similar to that shown in FIG. 5, however where all 12 bearing staves make direct abutting contact with the drive shaft 23 and all bearing staves are identical with a 0.313" (inches) rubber thickness (0.79502 cm thickness). Six staves are in the load-carrying bottom half of the bearing. With bearing staves of the same construction and the identical standard surface finish but only have four (4) staves directly supporting the drive shaft as depicted by either FIGS. 4 or 5, the coefficient of friction is substantially reduced. Two staves are in the load-carrying bottom half of the bearing. As an example at shaft speed of 20 rpm, the 4 stave bearing assembly has a coefficient of friction of 0.018 compared to a 12 stave bearing assembly wherein all twelve stave make abutting contact with the drive shaft and provides a coefficient of friction of 0.054. This differential in difference continues for the remainder of the curves. In the comparison of glass smooth surface finish of staves, at 20 rpm's the coefficient of friction for a twelve (12) stave bearing assembly is 0.0054 compared to a four (4) stave bearing assembly which is 0.0042. As the shaft speed is increased in the latter example for glass smooth surface finishes, the coefficient of friction comparison increases dramatically. At 60 rpm, the coefficient of friction for a twelve (12) glass stave bearing assembly is 0.002 compared to a four (4) glass stave bearing assembly of 0.0008, which is substantial.

Figure 8:
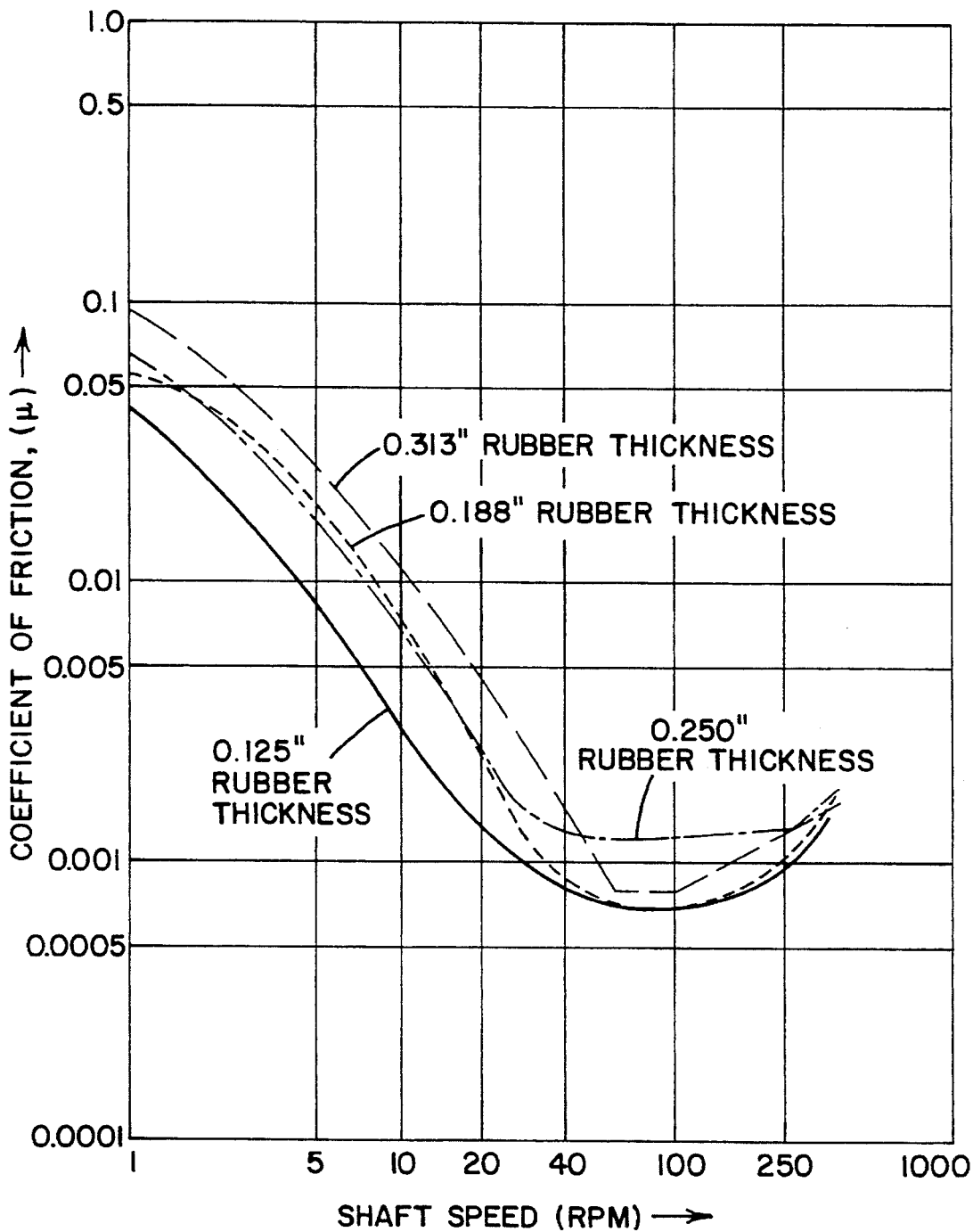
FIG. 8 is a graph illustrating the coefficient of friction versus shaft speed in four stave bearing assemblies having different thickness of rubber.

Referring to the graph in FIG. 8 as a further example of tests performed on four stave bearing assemblies using only glass smooth surface finishes on the rubber surfaces where only the rubber thickness was varied from 0.125 inches (0.3175 cm), to 0.250 inches (0.63 cm) to 0.188 inches (0.4776 cm) to 0.313 inches (0.795 cm), the 0.313 inch rubber thickness initially had slightly higher coefficient of frictions but at the higher speeds showed improved results. The 0.125 inch rubber thickness bearing showed best results.

Figure 9:
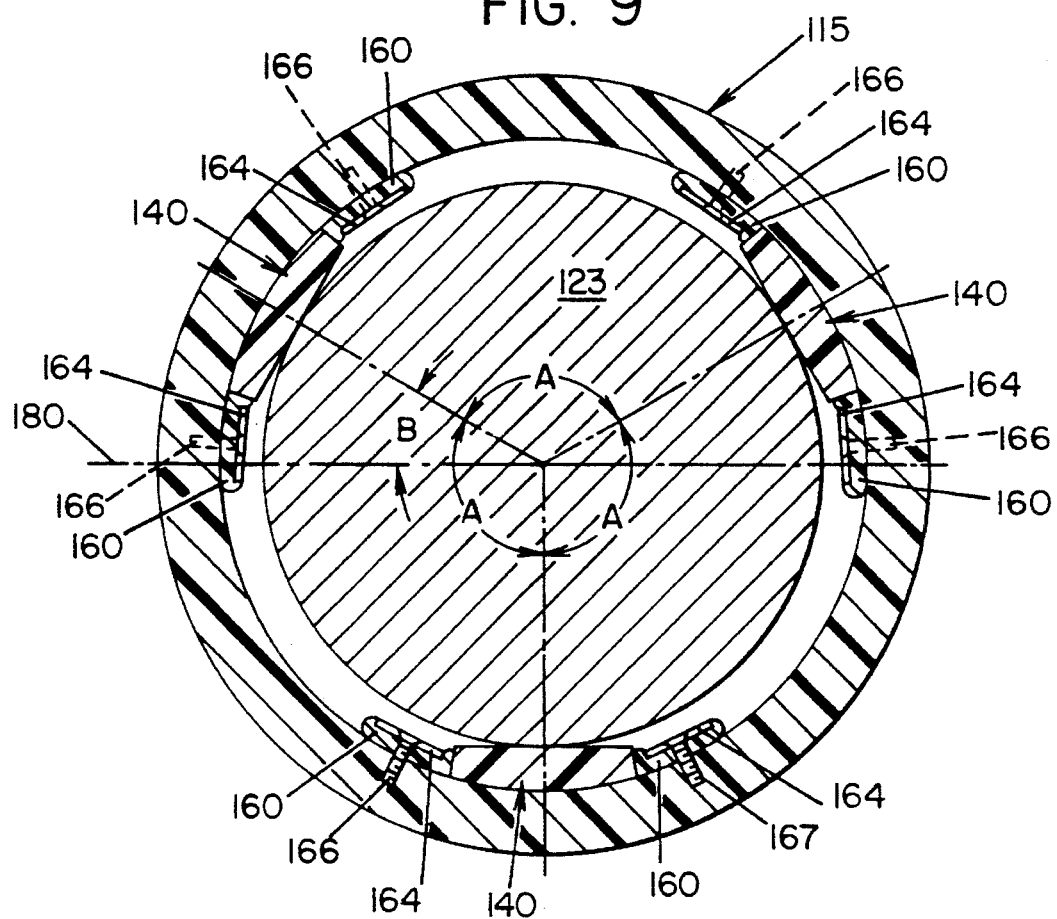
FIG. 9 is a cross sectional view of a second embodiment of a bearing assembly in accordance with the present invention.

Referring now to FIG. 9, wherein a bearing assembly in accordance with an alternate embodiment of the present invention is generally similar to the bearing assemblies illustrated hereinbefore in the previous figures and is thus indicated by reference numerals corresponding to those discussed above, except that a 100 "prefix" is utilized. A housing 115 has three staves 140 provided around the radial inner portion thereof. Each stave 140 is held in place by a pair of elastomeric members 160. A rigid plate or bar 164 is disposed on top of each elastomeric member 160. A screw or bolt 166 extends through a clearance shaft (not shown) in each bar 164 and elastomeric member 160 and engages with threaded hole 167 in housing 115. Tightening screw 166 pulls rigid plate 164 toward housing 115, thereby compressing and deforming each elastomeric member 160 to expand sideways and put compression on each stave 140 and hold them in place.

Lower stave 140 supports drive shaft 123, and the two upper staves 140 tangentially engage the drive shaft 123 in cooperative action with the lower stave 140 to prevent extraneous flexing of the shaft 123.

Housing 115 is preferably made from the material described hereinbefore for the previous figures. Staves 140 may be constructed as the staves 40 previously described hereinbefore. Preferably, staves 140 may be made from an elastomeric/plastic composite, such as that described in commonly owned U.S. Pat. No. 3,993,371 or a homogeneous slippery polymer alloy (SPA) such as is disclosed in U.S. Pat. Nos. 4,725,151 and 4,735,982, all of which are hereby incorporated herein by reference. To this end, it has been discovered that certain material factors for staves 140 are important. First, hydrophobic materials are preferred. Second, the elastomer hardness should be about 70 shore A. Third, the ratio of journal diameter of the shaft to the top width of the stave should be about 4 to 7. Fourth, the elastomer thickness should be about 0.125 inch to 0.312 inch. Fifth, the surface finish of the stave should be under 10 micro inches. Sixth, harder polymer alloy bearing contact material, such as the SPA material described above provides the most favorable wear and friction characteristics. The most preferred construction for staves 140 illustrated in FIG. 9 are stave made of the SPA material described above.

Elastomeric members 160 are preferably comprised of natural or nitrile rubber compounds, and are preferably 0.75 to 1.5 inches wide before compression. Rigid plates 164 are preferably comprised of a metal, such as stainless steel, or a hard plastic, such as fiber reinforced epoxy. The compressed elastomeric members 160 expand to grip the sides of the staves 140. They also distort around the ends of the staves to provide an axial locking feature.

The three staves are preferably located approximately 120° apart (angle A), with the two upper staves located approximately 30° (angle B) above horizontal line 180 and the lower stave located approximately 90° below horizontal 180.

Figure 10:
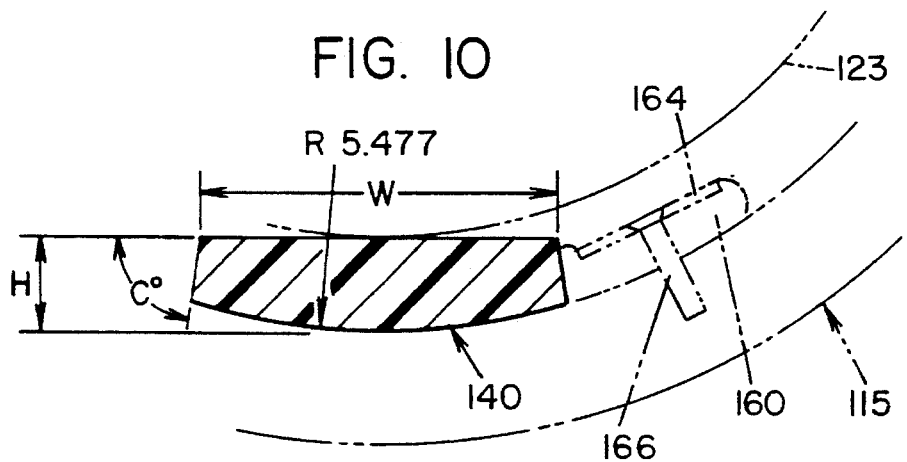
FIG. 10 is a cross sectional view of a bearing stave for use in the bearing assembly shown in FIG. 9.

Referring now to FIG. 10, for a housing 115 having an inner diameter of 10.954 inches, the width D of each stave is preferably 4 inches, the height H is preferably 0.75 inch, and angle C is preferably 80°.

Figure 11:
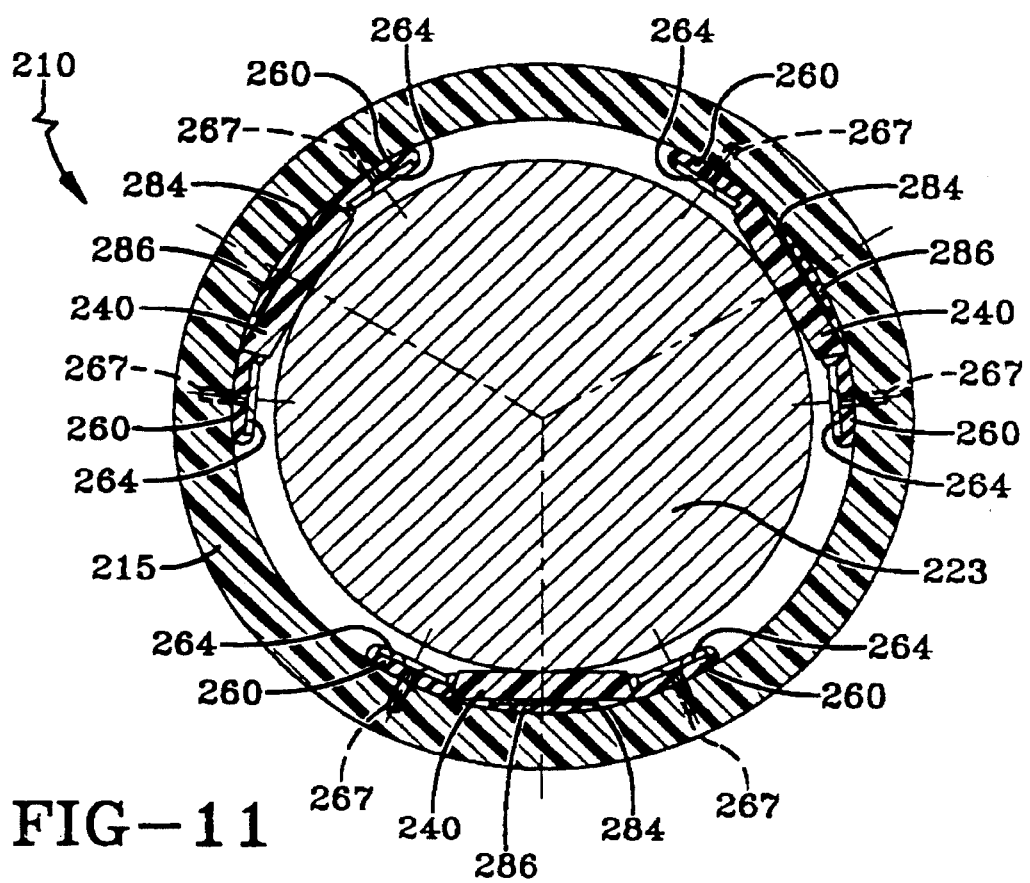
FIG. 11 is a cross sectional view of a third embodiment of a bearing assembly in accordance with the present invention.

Referring now to FIG. 11, wherein a bearing assembly 210 in accordance with an alternate embodiment of the present invention is generally similar to the bearing assemblies illustrated hereinbefore in the previous figures and is thus indicated by reference numerals corresponding to those discussed above, except that a 200 "prefix" is utilized. A housing 215 has three staves 240 provided around the radial inner portion thereof. Each stave 240 is held in place by a pair of elastomeric members 260. A rigid plate or bar 264 is disposed on top of each elastomeric member 260. A screw or bolt 266 extends through a clearance shaft (not shown) in each bar 264 and elastomeric member 260 and engages with threaded hole 267 in housing 215. Tightening screw 266 pulls rigid plate 264 toward housing 215, thereby compressing and deforming each elastomeric member 260 to expand sideways and put compression on each stave 240 and hold them in place.

Each stave 240 has a substantially flat back side 282 and is supported by one or more shims or pads 284, 286. Preferably, each stave 240 is in contact with a top shim 284 comprised of a hard material, (such as metal, composite material or other hard plastic), which is supported by a bottom pad 286 comprised of a resilient or compressible material, (such as soft plastic, rubber or other elastomer). Flat backed staves are more economical to produce compared with round backed staves. Lower stave 240 supports drive shaft 223, and the two upper staves 240 tangentially engage the drive shaft 223 in cooperative action with the lower stave 240 to prevent extraneous flexing of the shaft 223.

Housing 215 is preferably made from the material described hereinbefore for the previous figures. Staves 240 are preferably made from the SPA elastomeric/plastic composite also described hereinbefore.

Bottom pads 286 offer alignment capability. Top shim 284 is utilized to control the operating clearance between the bearing bore and the shaft 223 to eliminate the grinding of critical stave surface and to simplify the bearing renewal and replacement process. The deflection capability of bearing 210 provides for a zero clearance bearing (ZCB). ZCB's are more stable because, among other things, the unloaded staves can be depressed by the rotating shaft 223 as it develops hydrodynamically pressurized lift-off pressure on the load carrying staves. Furthermore, gritty water stave wear in a ZCB will be greatly reduced because the reverse flow particle rejection process is most efficient when the shaft (journal) is in contact with the stave (no unloaded clearance space). In a ZCB there is zero clearance between all of the staves and the shaft. In a conventional stave bearing designed with initial clearance, the side or top staves are unloaded with the shaft not touching them. The efficiency of the reverse flow particle rejection process is greatly reduced with any clearance present, thereby causing wear of surfaces of the side or top staves. The grit particles pass through the clearance space instead of being rejected back flowing out through the water groove.

Elastomeric members 260 are preferably comprised of natural or nitrile rubber compounds, and are preferably 0.75 to 1.5 inches wide before compression. Rigid plates 264 are preferably comprised of a metal, such as stainless steel, or a hard plastic, such as fiber reinforced epoxy. The compressed elastomeric members 260 expand to grip the sides of the staves 240. They also distort around the ends of the staves to provide an axial locking feature.

The three staves are preferably located approximately 120° apart (angle A), with the two upper staves located approximately 30° (angle B) above horizontal line 280 and the lower stave located approximately 90° below horizontal 280.

Figure 12:
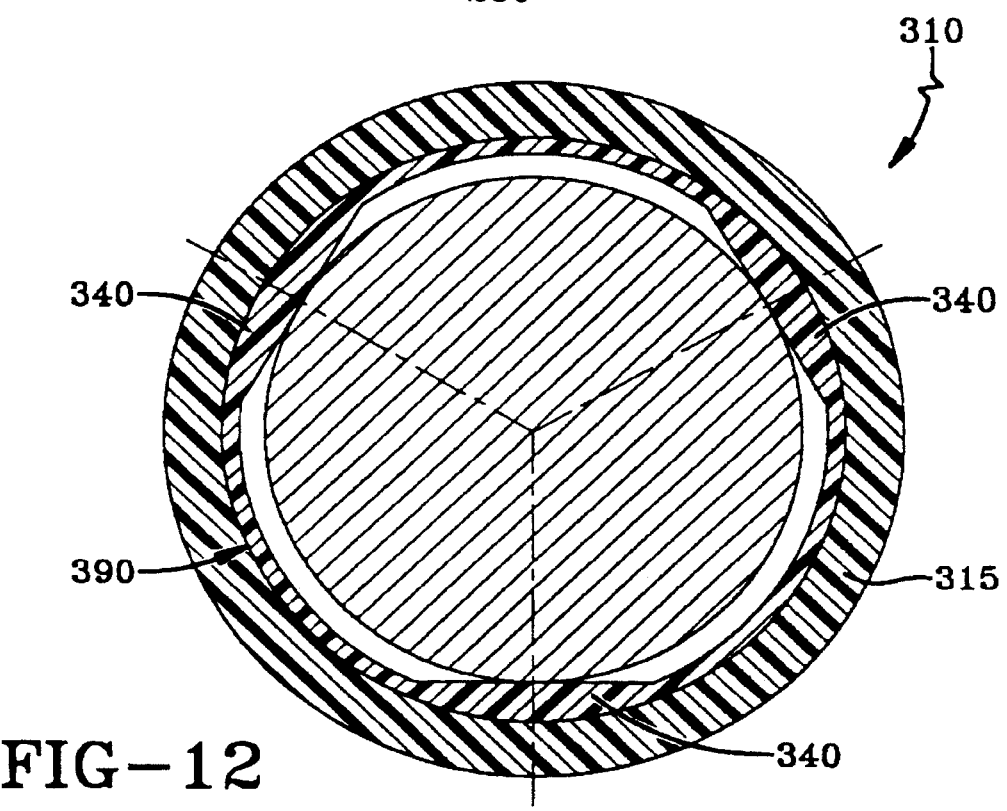
FIG. 12 is a cross sectional view of a fourth embodiment of a bearing assembly in accordance with the present invention.

Referring now to FIG. 12, wherein a bearing assembly 310 in accordance with an alternate embodiment of the present invention is generally similar to the bearing assemblies illustrated hereinbefore in the previous figures and is thus indicated by reference numerals corresponding to those discussed above, except that a 300 "prefix" is utilized.

A housing 315 has three staves or lands 340 provided around the radial inner portion thereof. Staves 340 are formed as a unitary or integral piece or lining 390, which is preferably made from the SPA elastomeric/plastic composite described hereinbefore. Housing 315 is preferably made from the housing materials also described hereinbefore.

The length to diameter ratio (L/D) of prior stave type bearings is required to be on the order of four to one for stablility reasons. Bearing 310 permits much lower L/D, possibly on the order of two to one, thereby reducing manufacturing costs. Also, lining 390 is relatively simple to manufacture and alleviates the need for machine finishing of the bore of housing 315.

It will be apparent that, although a specific embodiment and a certain modification of the invention has been described in detail, the invention is not limited to the specifically illustrated and described constructions since variations may be made without departing from the principles of the invention.

I claim:

1. A bearing assembly for holding a shaft comprising:
   a shell having a) a central opening with a central axis; and b) an inner peripheral body portion defined by said central opening;
   a plurality of staves disposed on said inner peripheral body portion for supporting the shaft, said staves comprising a first member for contacting the shaft and a second member disposed between said first member and said shell; and,
   a plurality of gripping members attached to said shell for holding said staves in place.

2. A bearing assembly for holding a shaft in accordance with claim 1, wherein said first member is comprised of splippery polymer alloy.

3. A bearing assembly for holding a shaft in accordance with claim 1, wherein said first member is comprised of plastic.

4. A bearing assembly for holding a shaft in accordance with claim 1, wherein said second member is comprised of:
   a backing shim conformable to the shape of said shell and disposed against said shell; and, an intermediate shim disposed between said backing shim and said first member for accurately positioning first member.

5. A bearing assembly for holding a shaft in accordance with claim 4, wherein said backing shim is comprised of elastomeric material and said intermediate shim is comprised of a rigid material.

6. A bearing assembly for holding a shaft in accordance with claim 1, wherein said first member is substantially rectangular in cross section.

7. A bearing assembly for holding a shaft in accordance with claim 1, further comprising:

a third member disposed between each one of said staves conformable to the shape of said shell and disposed against said shell.

8. A bearing assembly for holding a shaft in accordance with claim 1, wherein said gripping member is comprised of an elastomeric member under compression.

9. A bearing assembly for holding a shaft in accordance with claim 1, wherein said gripping member is comprised of an elastomeric member compressed by a rigid plate.

10. A bearing assembly for holding a shaft comprising:

a shell having a) a central opening with a central axis; and b) an inner peripheral body portion defined by said central opening;

a plurality of staves disposed between said inner peripheral body portion and the shaft for supporting the shaft; and, a plurality of gripping members attached to said shell for holding said staves in place.

11. A bearing assembly for holding a shaft in accordance with claim 10, wherein said staves are comprised of splippery polymer alloy.

12. A bearing assembly for holding a shaft in accordance with claim 10, wherein said staves are comprised of plastic.

13. A bearing assembly for holding a shaft in accordance with claim 10, further comprising:

shim means disposed between each one of said staves comprised of:

a backing shim conformable to the shape of said shell and disposed against said shell; and, an intermediate shim disposed between said backing shim and said staves for accurately positioning said staves.

14. A bearing assembly for holding a shaft in accordance with claim 13, wherein said backing shim is comprised of elastomeric material and said intermediate shim is comprised of a rigid material.

15. A bearing assembly for holding a shaft in accordance with claim 10, wherein said staves are substantially rectangular in cross section.

16. A bearing assembly for holding a shaft in accordance with claim 10, further comprising:

a second member disposed between each one of said staves conformable to the shape of said shell and disposed against said shell.

17. A bearing assembly for holding a shaft in accordance with claim 10, wherein said gripping member is comprised of an elastomeric member under compression.

18. A bearing assembly for holding a shaft in accordance with claim 10, wherein said gripping member is comprised of an elastomeric member compressed by a rigid plate.

\* \* \* \* \*